US012182055B1

(12) United States Patent
Guo et al.

(10) Patent No.: US 12,182,055 B1
(45) Date of Patent: Dec. 31, 2024

(54) POWER CONTROL LOGIC USING INTER-CHIP

(71) Applicant: Amazon Technologies, Inc., Seattle, WA (US)

(72) Inventors: Linfei Guo, South San Francisco, CA (US); Sagnik Kar, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/080,659

(22) Filed: Dec. 13, 2022

(51) Int. Cl.
*G06F 13/14* (2006.01)
*G06F 1/3234* (2019.01)
*G06F 13/42* (2006.01)

(52) U.S. Cl.
CPC ........ *G06F 13/4282* (2013.01); *G06F 1/3253* (2013.01); *G06F 2213/0038* (2013.01)

(58) Field of Classification Search
None
See application file for complete search history.

(56) References Cited

U.S. PATENT DOCUMENTS

| 11,356,238 | B1 * | 6/2022 | Bhardwaj | H03K 7/08 |
| 2019/0064910 | A1 * | 2/2019 | Wang | G06F 1/3215 |
| 2019/0250697 | A1 * | 8/2019 | Mocanu | G06F 3/0604 |
| 2021/0271276 | A1 * | 9/2021 | Seok | G06F 1/26 |

\* cited by examiner

Primary Examiner — Henry Tsai
Assistant Examiner — Dean Phan
(74) Attorney, Agent, or Firm — Lee & Hayes, P.C.

(57) ABSTRACT

Systems and techniques for power delivery to an electronic device using multiple power management integrated circuits (PMICs) are described herein. The systems and techniques provide for two signal connections between each of the PMICs to sync transition signals on a first line and provide faults to interrupt operations on a second line. The PMICs are connected to an electronic device that commands power transitions for voltage rails from the PMICs with the commands received over I2C communication from the electronic device.

20 Claims, 6 Drawing Sheets

POWER CONTROL LOGIC USING INTER-CHIP

BACKGROUND

Various example embodiments of the inventive concepts relate to power control, and more particularly, to power management integrated circuit (PMIC) systems, methods, and apparatuses for inter-device signaling by using an interface implemented by dual pins.

A system on chip (SoC) indicates a technology of integrating various functional blocks such as a central processing unit (CPU), a memory, a digital signal processing circuit, and/or an analog signal processing circuit, into one semiconductor integrated circuit or one integrated circuit integrated according to the technology. An SoC is developed to a further complex system including a processor, multimedia, graphics, security, and the like. An SoC embedded in mobile devices, such as smartphones and tablet PCs, etc., includes a PMIC in response to an increase in demand for the power necessary for various functions of the mobile device, as well as for efficient power management. The PMIC performs a power conversion function and a power sequence function for outputting various output voltages to voltage rails.

BRIEF DESCRIPTION OF THE DRAWINGS

The detailed description is described with reference to the accompanying drawings. The use of the same reference numbers in different figures indicates similar or identical components or features.

DETAILED DESCRIPTION

Figure 1:
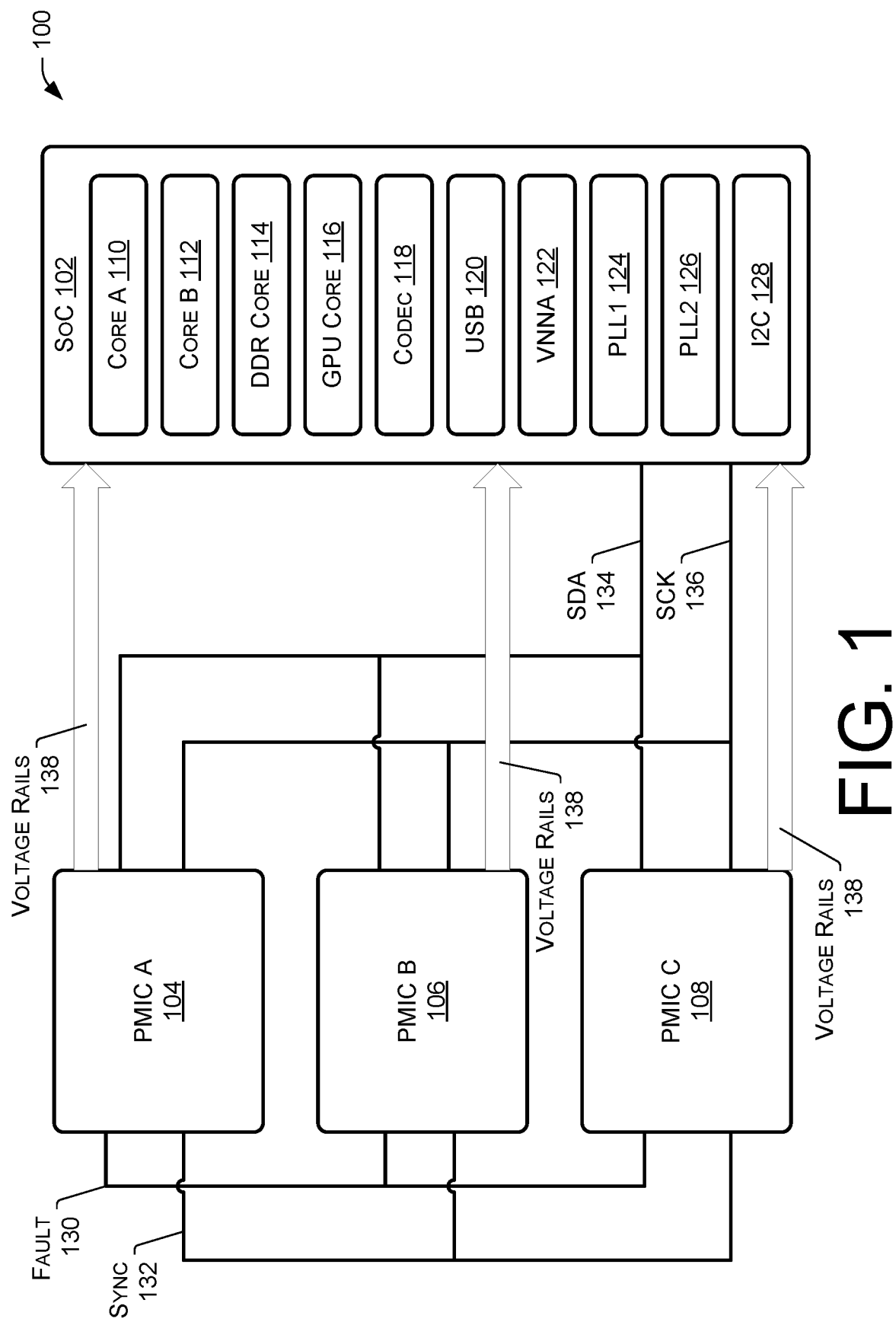
FIG. 1 illustrates an example system architecture for controlling multiple PMICs for power delivery to an SoC, according to at least one example.

Described herein are, among other things, techniques, devices, and systems, for providing and adjusting power solutions to electronics systems. For example, many electronics systems require complex power solutions that consists of multiple voltage rails, each with different voltage and current requirements. In an illustrative example, a System on a Chip (SoC) may have more than 10 different voltage supplies, and each one of those voltage supplies may be expected to be independently controlled. The control of the voltage supplied on the voltage rails may be performed by Power-Management Integrated Circuits (PMICs). The PMICs may generate the voltage rails for the voltage supplies for the device. The generation of voltage rails places a burden on the PMICs to generate these rails within constraints of the PMICs such as cost, routing, and/or thermal limits. Therefore, in some examples, multiple PMICs may be used to supply the voltage rails for the device (such as the SoC).

In some examples, circuits in the PMIC are too large, an increased physical footprint size may increase costs associated with operations due to circuit layout challenges, external component placement congestion, thermal density challenges, and/or increased complexity of the PMIC design, etc. When reaching a PMIC physical size limit, an SoC may employ multiple PMICs. The multiple PMICs may disperse the thermal load and allow external components to be easily placed. However, demand for a plurality of board-level connection parts (or pins) for communication and operation coordination between the multiple PMICs may exist. The plurality of board-level connection parts may cause SoC board-level routing congestion. Accordingly, pin count reduction for improving and/or optimizing a physical area, an operating cost, and routing of the PMIC and/or SoC is advantageous.

In operation, the PMICs control and provide the voltage rails in a fast, responsive, and accurately timed manner. In an architecture with multiple different PMICs, controllers for each of the PMICs to produce a set of voltage rails are distributed across the PMICs providing the voltage rails. Therefore, accurate timing and responsiveness to commands for providing and/or adjusting power supplies is accomplished by synchronizing the multiple PMICs. The techniques and systems described herein provide for synchronization of the multiple PMICs to provide the required power supplies at the voltage rails, and control over the voltage levels at the voltage rails without incurring significant additional hardware and complex architecture.

The systems and techniques described herein provide for coordination of multiple PMICs and scalability to any number of PMICs for a single power delivery solution for increasing complex electronic systems. The systems and techniques described herein provide for a low-overhead signaling and control method for coordinating multiple PMICs for a device. The low-overhead is a result of the introduction of only two additional signals between all PMICs, thereby avoiding introduction of significant overhead in pairs of bidirectional communication buses between each PMIC that would result in exponentially increasing complexity and numbers of bidirectional connections that makes scalability difficult and expensive.

In the systems and techniques described herein, only two additional signals are needed between all PMICs. The first signal of the two additional signals is an asynchronous "fault" signal that ensures an immediate response to various fault events occurring on one or more devices of the power supply system. This asynchronous fault signal provides low-latency communication such that prompt action may be taken against fault events.

The second signal of the two additional signals is a single-wire "sync" signal. This sync signal transmits commands from one PMIC (e.g., a main or primary PMIC) to the rest of the PMICs. The sync signal additionally synchronizes the actions of the different PMICs, for example in response to commands from an SoC to adjust or change power delivery to the device.

The sync signal and fault signal are communicated between all of the PMICs such that each PMIC will have connections to the SoC through a first communication channel and a second communication channel, and each PMIC is connected to the other PMICs in the architecture through the fault signal and the sync signal rather than individually connecting each PMIC to every other PMIC in the system. Therefore, the system and technique provides scalability that enables the device to use any number of PMICs for power delivery solutions without requiring additional pins or connections between PMICs and/or between the PMICs and the SoC.

Additionally, the systems and techniques provided herein may be used with an existing I2C interface. In such examples, the I2C interface may include a synchronous serial communication bus and may be used in some examples described herein. For example, PMIC actions can be controlled and monitored in a closed loop fashion that provides additional reliability and robustness for the power delivery system. In an illustrative example, the SoC may instruct a change in a power state of the device, for example from an active power state to a low power state, and/or from a low power state to an active power state, and/or to change features or functions of the device. The SoC may issue a command to the PMICs via a main PMIC instructing the change in the power state. The command may be issued to the main PMIC through the I2C communication bus. The main PMIC, through the sync signal, transmits the command to the remainder of the PMICs in the system. The single sync signal is simultaneously transmitted to the PMICs in the system. The command may include sequencing required for the transition, including sequences of actions by various different PMICs controlling different voltage rails. The sequencing may also include timing of the transitions and actions to be carried out. The sync signal is transmitted to all of the PMICs in the system. After the transition is completed, in some examples, the SoC may read the power state of the PMICs via the I2C communication bus (e.g., the read line) to confirm that the PMICs transitioned to the correct power state. In this manner, the power delivery transitions may be monitored in a closed loop fashion. In some examples, the power state may be communicated from one or more of the companion (e.g., secondary or non-main) PMICs. In this manner, the power state information is communicated through the PMICs other than the main PMIC, ensuring that the main PMIC properly communicated the command through the sync signal.

In an illustrative example, a power state transition using the two-wire signal system (e.g., the fault signal and the sync signal) is accomplished in a number of steps or sequences. Initially, the SoC may determine a power transition to occur for the device, such as an active to a low power transition. The SoC may convey the power transition in a command to the main PMIC through I2C bus (e.g., over the data "SDA" line and/or "SCK" line). The main PMIC, after receiving the command, decodes the command to understand the power transition including the sequence and timing for the power transition. In the illustrative example, the command may include to move the system to a low power state, and the particular sequence may include reducing voltage on particular rails to predefined values. Additionally, the timing, sequence, and/or order of the steps to occur are predefined. In some examples, the predefined actions, timing, and/or sequence to take place as part of the power transition may be defined in hardware or using software by defining it using a communication interface between the SoC and the main PMIC prior to the power transition taking place. In some examples, the definition of the voltage values, timing, actions, and/or sequences may be done prior to any communication from the main PMIC to the other PMICs of the system, e.g., the definition may be established prior to the main PMIC sending anything across a sync line (as described herein) to the other PMICs.

The main PMIC may begin the power transition by sending a command on the sync line to the other PMICs in the power delivery system. For example, in a system with one main and two companion PMICs, the sync signal will communicate the command from the main PMIC to the two companion PMICs across the sync line. In some examples, and based on the predefined protocol, the companion PMICs may acknowledge the command with an acknowledge message on the sync signal line. The acknowledgement may serve as a synchronization signal between the PMICs such that voltage changes across rails controlled by different PMICs may be coordinated to happen simultaneously.

After the power state transitions are complete, the PMICs may initiate a communication over the I2C bus to the SoC indicating confirmation of the transition and completion of the action. In some examples, the confirmation may be conveyed by a PMIC other than the main PMIC, such that the confirmation comes through a PMIC connected to the main PMIC through the sync signal ensuring that the sync signal was propagated to the companion PMICs, thereby ensuring compliance and closing the loop on the command.

In some examples, the systems and techniques described herein include a power management system for a device. The power management system includes a system on a chip (SoC) that may include a data pin and a clock pin. The system also includes a main power management integrated circuit (PMIC) coupled to the data pin and the clock pin and configured to provide power to the SoC on a first plurality of voltage rails and a companion PMIC coupled to the data pin and the clock pin and further coupled to the main PMIC through a first communication channel and a second communication channel and configured to provide power to the SoC on a second plurality of voltage rails. In some examples, a first signal instructing a transition of a power state of one or more of the first plurality of voltage rails or the second plurality of voltage rails is conveyed to the main PMIC from the SoC via the data pin and a second signal is conveyed to the companion PMIC via the first communication channel to sync an action of the companion PMIC based on the first signal.

Implementations may include one or more of the following features. In some examples, the first communication channel may include a unidirectional synchronization channel between the main PMIC and the companion PMIC. The second communication channel may include a bidirectional fault channel between the main PMIC and the companion PMIC, the bidirectional fault channel configured for asynchronous signaling of fault events. The first signal may include a command to transition a voltage on one or more power supply rails between the main PMIC or the companion PMIC and the SoC.

In some examples, the techniques and systems described herein include a method that includes coupling a main PMIC to an SoC through a first pin and a second pin. The method also includes coupling a companion PMIC to the main PMIC through a first channel and a second channel. The method further includes receiving a command from the SoC at the main PMIC, the command may include a power state transition for one or more power supply rails of the SoC. The method also includes syncing the power state transition at the companion PMIC through the first channel. The method also includes causing, in response to syncing the power state transition, the power state transition through the main PMIC and the companion PMIC. The method also includes conveying a confirmation to the SoC of the power state transition.

Implementations may include one or more of the following features. In some examples, the method may include coupling a second companion PMIC to the main PMIC through the first channel and the second channel, the main PMIC, companion PMIC, and second companion PMIC providing power delivery to the SoC on the power supply rails. In some examples, syncing the power state transition may include syncing the second companion PMIC through the first channel; and causing the power state transition is further through the second companion PMIC. Syncing the power state transition may include syncing a power state for one or more of the power supply rails and a timing of the power state transition. The main PMIC may be configured for control of a master reset for a processing unit of the SoC. In some examples, the command may include a command to change from an active power state to a low power state and syncing the power state transition may include the main PMIC transmitting a sequence for the power state transition from the active power state to the low power state on the first channel. Conveying the confirmation may include the SoC accessing a power state of the main PMIC and the companion PMIC via an I2C channel. Conveying the confirmation may include the companion PMIC conveying the confirmation to the SoC. The second channel may be configured for asynchronous communication of fault events between the main PMIC and the companion PMIC.

In some examples, the systems and techniques described herein include a system including an SoC, a main PMIC coupled to the SoC through a first connection, a second connection, and a first plurality of voltage rails. The system also includes a companion PMIC, where the companion PMIC is coupled to the SoC through the first connection, the second connection, and a second plurality of voltage rails. The companion PMIC is coupled to the main PMIC through a first channel and a second channel and receives a sync signal from the main PMIC via the first channel in response to the main PMIC receiving a power transition signal from the SoC, the power transition signal and sync signal instructing a change in a power state of one or more voltage rails of the first plurality of voltage rails or the second plurality of voltage rails.

Implementations may include one or more of the following features. In some examples, the system may include a second companion PMIC, where the second companion PMIC is coupled to the SoC through the first connection, the second connection, and a third plurality of voltage rails. The second companion PMIC may be coupled to the main PMIC through the first channel and the second channel and receives the sync signal from the main PMIC via the first channel in response to the main PMIC receiving the power transition signal from the SoC. The sync signal may include the power transition signal and a timing of the power transition signal. The power transition signal may include a command to transition a device from an active power state to a low power state and the sync signal may include a sequence to transition from the active power state to the low power state. The companion PMIC may be further configured to convey a confirmation of the power transition signal to the SoC via the second connection. The first channel may include a unidirectional synchronization channel between the main PMIC and the companion PMIC. The second channel may be configured for asynchronous communication of fault events between the main PMIC and the companion PMIC.

Turning now to the figures, FIG. 1 illustrates an example system architecture 100 for controlling multiple PMICs for power delivery to an SoC 102, according to at least one example. The SoC 102 may be an example of a component of a device, for example any device that includes computer systems or devices may include the SoC 102. For example, the SoC 102 may be implemented in a device such as an electronic device including, for example, a wireless mobile device, a mobile telephone, a mobile computing system, a laptop computer, a tablet computing device, a media player, a gaming device, a smart device, an Internet of Things device, a virtual reality and/or augmented reality device, a television, an appliance, a vehicle, or other such device. The device may include a wireless communication device configured to communicate with a radio access network, a core access network, the Internet, and/or other networks.

The SoC 102 is shown having dual pins, SDA 134 and SCK 136 through which signals are communicated as described herein. The dual pins, SDA 134 and SCK 136 may include a two-wire communication system such as an I2C interface that may send and receive information across both the SDA 134 and SCK 136 lines as a two wire communication bus. The SoC 102 may communicate and/or include multiple PMICs such as PMIC A 104, PMIC B 106, and PMIC C 108 and may also be in communication with or include components such as a processor (or processors) for example including core A 110, core B 112, DDR core 114, GPU core 116, codec 118, USB 120, VNNA 122, PLL1 124, PLL2 126, and I2C 128 for example. Though depicted with the SoC 102 including the components described above, the SoC 102 may include fewer or greater than the components listed above, with the above components listed as illustrative. The SoC 102 may have or need many different voltage supplies, and each one of those voltage supplies may be expected to be independently controlled. The different voltage supplies may be configured to provide voltage at varying levels to the components core A 110, core B 112, DDR core 114, GPU core 116, codec 118, USB 120. VNNA 122. PLL1 124, PLL2 126, and I2C 128. The different voltage supplies may be provided simultaneously to the components through one or more voltage rails using the PMICs (e.g., PMIC A 104, PMIC B 106, and PMIC C 108). The PMICs may generate the voltage rails for the voltage supplies for the components of the SoC 102. The voltage rails may include the voltage rails 138 through which power is supplied to the components of the SoC 102.

In operation, the PMICs control and provide the voltage rails 138 in a fast, responsive, and accurately timed manner. In an architecture with multiple different PMICs, controllers for each of the PMICs to produce a set of voltage rails are distributed across the PMICs providing the voltage rails. Therefore, accurate timing and responsiveness to commands for providing and/or adjusting power supplies is accomplished by synchronizing the multiple PMICs. The techniques and systems described herein provide for synchronization of the multiple PMICs to provide the required power supplies at the voltage rails, and control over the voltage levels at the voltage rails 138 without incurring significant additional hardware and complex architecture.

Figure 3:
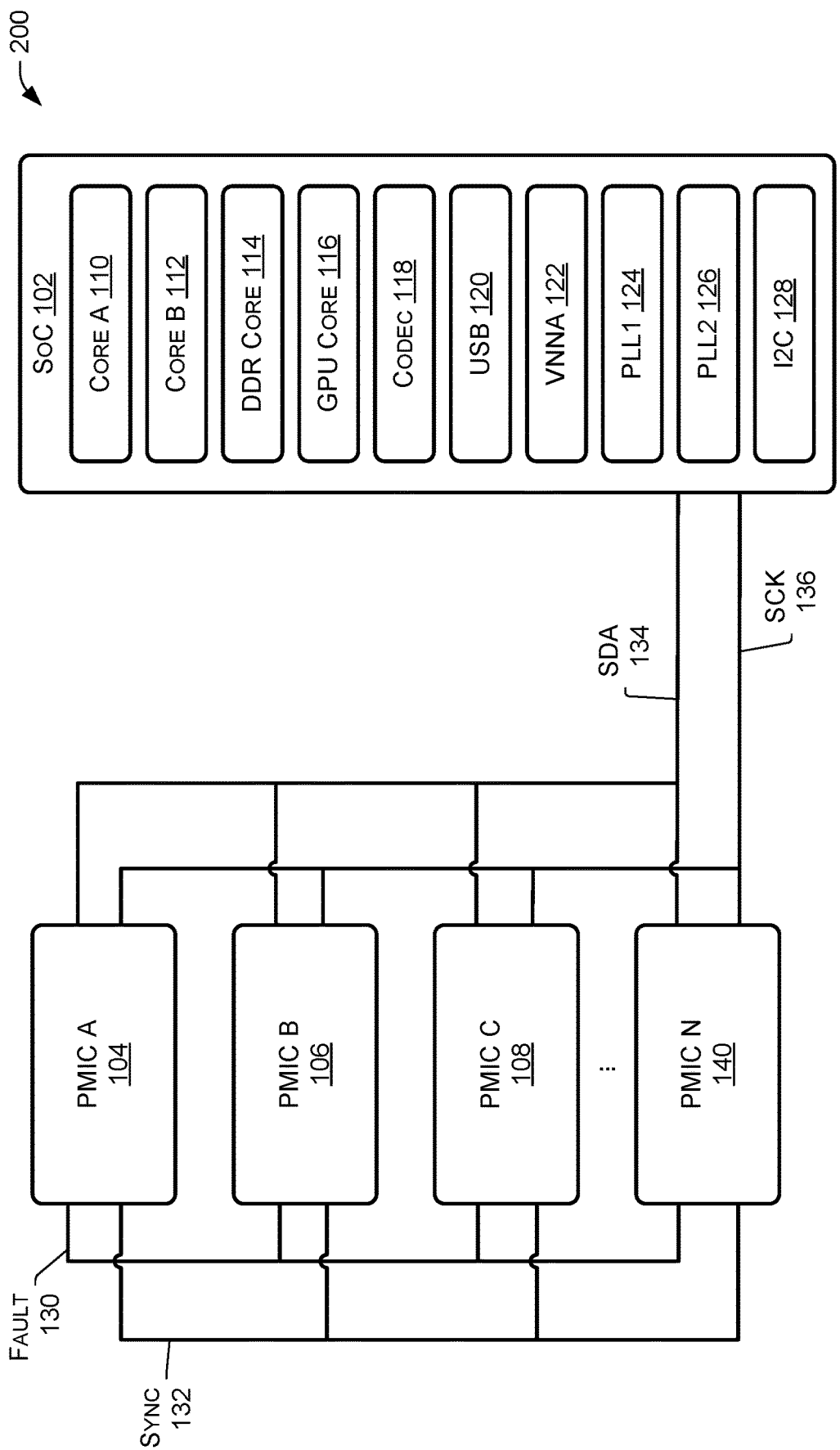
FIG. 3 illustrates an example system architecture for controlling multiple PMICs for, according to at least one example.

The PMICs include multiple PMICs, showing three illustrated in FIG. 1, four illustrated in FIG. 3, though more or fewer than these numbers may be implemented in some examples, following the configuration and layout described herein to scale up or down the number of PMICs. PMIC A 104 may be a main PMIC while PMIC B 106 and PMIC C 108 may be companion PMICs. The dual pins 134 and 136 may connect to the PMICs, in particular between PMIC A 104 and the SoC 102. Command data and/or control information and/or confirmation data may be exchanged through the dual pins over the I2C between the SoC 102 and PMIC A 104 and/or the other PMICs The one or more PMICs, that is, the main PMIC, PMIC A 104, and companion PMICs (PMIC B 106 and PMIC C 108) include the fault 130 and sync 132 communication interfaces. The communication interfaces connect the main PMIC with the companion PMICs, that is PMIC A 104 with PMIC B 106 and PMIC C 108 through two signal (e.g., fault 130 and sync 132) lines. The PMICs, that is, the main PMIC A 104, the companion PMIC B 106, and the companion PMIC C 108, may include a plurality of power converters to control the voltage rails 138 respectively connected to the PMICs, by using information provided through the communication interfaces SDA 134 and SCK 136, so that a power source voltage is supplied, or blocked, (e.g., enabled and/or disabled) to or from all or partial number of the power domains of the SoC 102. PMIC A 104 may be identified as being a PMIC providing voltage rails 138 to control a master reset of the SoC 102 in some examples.

The two signal (e.g., fault 130 and sync 132) lines may include a first signal communication channel and a second communication channel. According to at least one example embodiment, the first communication channel, fault 130 may perform communication using a single bidirectional signaling scheme, and the plurality of PMICs, for example, PMIC A 104, the PMIC B 106, and PMIC C 108, may be coupled to each other through the first communication channel, but the examples are not limited thereto. The fault 130 is an asynchronous "fault" signal that ensures an immediate response to various fault events occurring on one or more devices of the power supply system. This asynchronous fault signal provides low-latency communication such that prompt action may be taken against fault events. The fault 130 may include low latency communications and may transmit low data content for providing rapid and timely fault signals. In some examples, fault 130 may communicate signals that require fast response and/or low-latency communications other than fault signals.

The sync 132 is a single-wire "sync" signal. This sync signal transmits commands from one PMIC (e.g., a main or primary PMIC such as PMIC A 104) to the rest of the PMICs (e.g., PMIC B 106 and PMIC C 108). The sync 132 additionally synchronizes the actions of the different PMICs, for example in response to commands from an SoC to adjust or change power delivery to the device. The sync 132 may include high data content communications and may, in some examples, occur over a high latency communication system.

The sync 132 and fault 130 are communicated between all of the PMICs such that each PMIC will have connections to the SoC 102 through a first communication channel and a second communication channel, and each PMIC is connected to the other PMICs in the architecture through the fault signal and the sync signal rather than individually connecting each PMIC to every other PMIC in the system. Therefore, the system and technique provides scalability that enables the device to use any number of PMICs for power delivery solutions without requiring additional pins or connections between PMICs and/or between the PMICs and the SoC 102.

PMIC A 104 may include connections to interface with the fault 130 and sync 132 lines as well as control logic (e.g., control logic circuitry) configured to control the interface. In some examples, the control logic may be any processing circuitry capable of controlling the communication interface, such as hardware, logic circuits, processors, processor cores, etc.; a hardware/software combination such as at least one processor core executing software and/or executing any instruction set, etc. or a combination thereof. For example, the processing circuitry more specifically may include, but is not limited to, a field programmable gate array (FPGA), a programmable logic unit, an application-specific integrated circuit (ASIC), etc. The communication interface may include at least a first pin through which the fault 130 signal is transmitted and/or received, and a second pin through which the sync 132 signal is transmitted and/or received, but the example embodiments are not limited thereto. For example, through the first pin, the fault 130 information may be transmitted to the other PMICs, and the fault 130 information output from the other PMICs may be received by PMIC A 104. The fault 130 signal may be provided using a bidirectional signaling access scheme using a single wire, or in other words, the fault 130 signal line may be a bidirectional signal line. Through the second pin, the sync 132 signal output from PMIC A 104 may be transmitted to PMIC B 106 and PMIC C 108. The sync 132 signal may be provided using a single unidirectional signaling access scheme, or in other words, the sync 132 signal line may be a unidirectional signal line.

In some examples, the sync 132 and/or fault 130 signals may be signals used for assertion and/or de-assertion of an operation including power state confirmation of all of the plurality of PMICs, as well as the power ON/OFF of a total system, i.e., the device including SoC 102.

PMIC B 106 may include a communication interface connected to the at least two signals (e.g., fault 130 and sync 132) lines and a control logic circuitry configured to control the communication interface. The communication interface may include a first pin through which the fault 130 signal is transmitted and/or received and a second pin through which the sync 132 signal is received, etc.

PMIC C 108 may include a communication interface connected to the at least two signals (e.g., fault 130 and sync 132) lines and a control logic circuitry configured to control the communication interface. The communication interface may include a first pin through which the fault 130 signal is transmitted and/or received and a second pin through which the sync 132 signal is received, etc.

An operation associated with power state information and a power sequence of the PMICs, that is, the PMIC A 104, PMIC B 106, and PMIC C 108, may be asserted by using a power status signal along the sync 132 exchanged among the plurality of PMICs. According to at least one example embodiment, the second signal line may perform communication using a single unidirectional signaling scheme, and the PMICs may be coupled through the second signal line. An operation of controlling a power sequence of the companion PMICs may be asserted by using a power sequence control signal transmitted from the main PMIC, PMIC A 104 to PMIC B 106 and PMIC C 108.

The system architecture 100 provides for coordination of multiple PMICs and scalability to any number of PMICs for a single power delivery solution for increasing complex electronic systems. The systems and techniques described herein provide for a low-overhead signaling and control method for coordinating multiple PMICs for a device. The low-overhead is a result of the introduction of only two additional signals (e.g., fault 130 and sync 132) between all PMICs, thereby avoiding introduction of significant overhead in pairs of bidirectional communication buses between each PMIC that would result in exponentially increasing complexity and numbers of bidirectional connections that makes scalability difficult and expensive.

Additionally, the system architecture 100 uses the I2C interface for synchronous serial communication and may be used in some examples described herein. For example, PMIC actions can be controlled and monitored in a closed loop fashion that provides additional reliability and robustness for the power delivery system. In an illustrative example, the SoC 102 may instruct a change in a power state of the device, for example from an active power state to a low power state, and/or from a low power state to an active power state, and/or to change features or functions of the device. The SoC 102 may issue a command to the PMICs via PMIC A 104 instructing the change in the power state. The command may be issued to the PMIC A 104 through the I2C communication bus, e.g., through SDA 134 and/or SCK 136. PMIC A 104, through the sync 132 signal, transmits the command to the remainder of the PMICs in the system. The single sync 132 signal is simultaneously transmitted to the PMICs in the system. The command may include sequencing required for the transition, including sequences of actions by various different PMICs controlling different voltage rails 138. The sequencing may also include timing of the transitions and actions to be carried out. The sync signal is transmitted to all of the PMICs in the system. After the transition is completed, in some examples, the SoC 102 may read the power state of the PMICs via the I2C communication bus (e.g., the SDA 134 line and/or SCK 136 line) to confirm that the PMICs transitioned to the correct power state. In this manner, the power delivery transitions may be monitored in a closed loop fashion. In some examples, the power state may be communicated from one or more of the companion (e.g., secondary, companion, or non-main) PMICs. In this manner, the power state information is communicated through the PMICs other than the main PMIC, ensuring that the main PMIC properly communicated the command through the sync signal.

Figure 2:
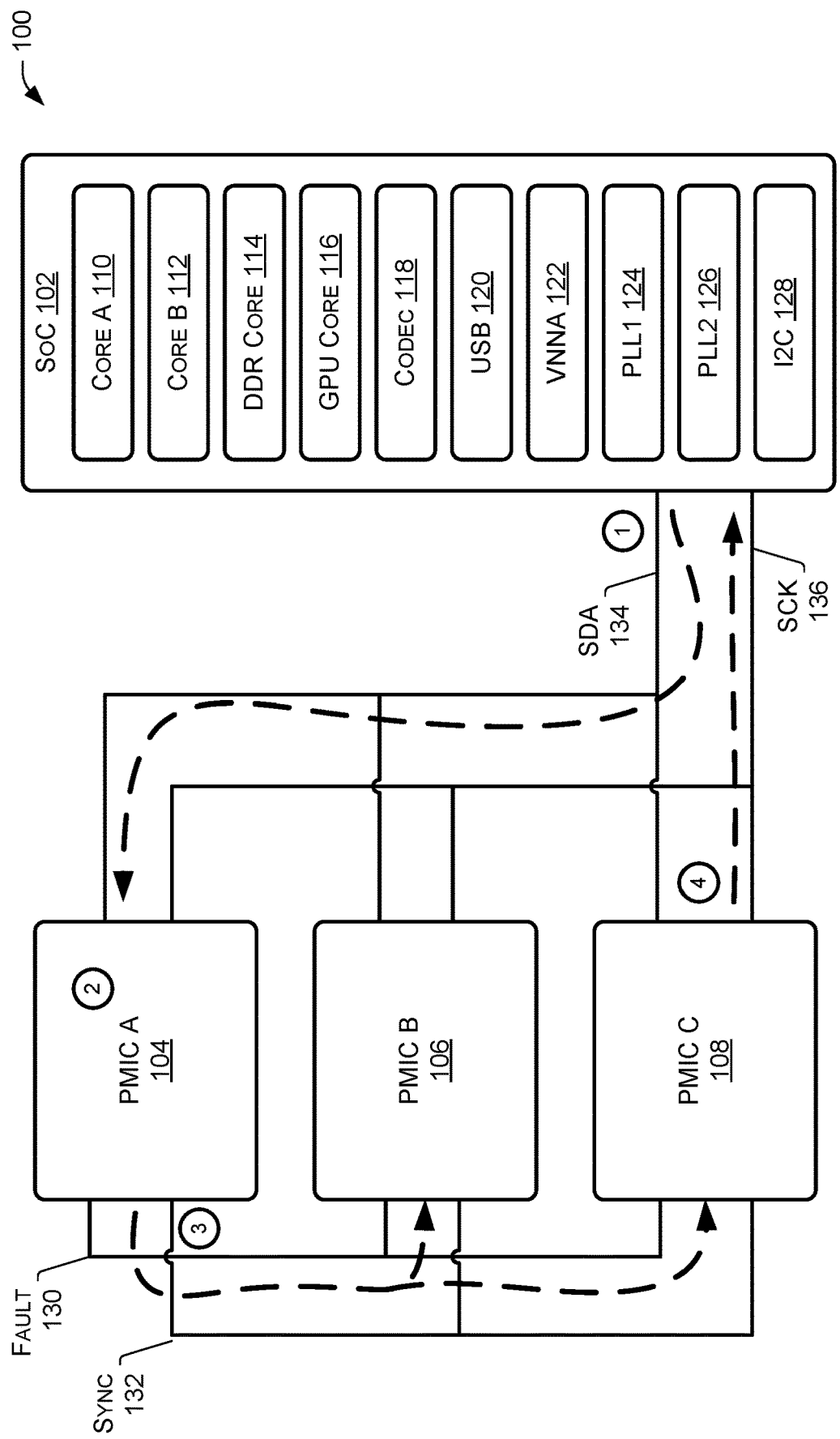
FIG. 2 illustrates an example system architecture and flow for controlling and signaling between multiple PMICs, according to at least one example.

FIG. 2 illustrates an example system architecture 100 and flow for controlling and signaling between multiple PMICs, according to at least one example. The system architecture 100 is identical to the system architecture described above with respect to FIG. 1, with a flow and sequence of events notated on FIG. 2 as an illustrative example. In the illustrative example, a power state transition using the two-wire signal system (e.g., the fault 130 signal and the sync 132 signal) is accomplished in a number of steps or sequences. Initially, at 1, the SoC 102 may determine a power transition to occur for the device, such as an active to a low power transition. The SoC 102 may convey the power transition in a command to PMIC A 104 through I2C bus (e.g., over the data SDA 134 line and/or the SCK 136 line). PMIC A 104, after receiving the command and at 2, decodes the command to understand the power transition including the sequence and timing for the power transition. In the illustrative example, the command may include to move the system to a low power state, and the particular sequence may include reducing voltage on particular voltage rails 138 to predefined values. Additionally, the timing, sequence, and/or order of the steps to occur are predefined.

PMIC A 104 may begin the power transition by sending a command, at 3, on the sync 132 line to the other PMICs (PMIC B 106 and PMIC C 108) in the power delivery system. In some examples, and based on the predefined protocol, the companion PMICs may acknowledge the command with an acknowledge message on the sync 132 line. The acknowledgement may serve as a synchronization signal between the PMICs such that voltage changes across voltage rails 138 controlled by different PMICs may be coordinated to happen simultaneously.

After the power state transitions are complete, the PMICs may initiate a communication over the I2C bus, at 4, (e.g., over the SDA 134 line and/or SCK 136 line) to the SoC 102 indicating confirmation of the transition and completion of the action. In some examples, the confirmation may be conveyed by a PMIC other than the main PMIC, such that the confirmation comes through a PMIC connected to the main PMIC through the sync 132 signal ensuring that the sync 132 signal was propagated to the companion PMICs, thereby ensuring compliance and closing the loop on the command.

FIG. 3 illustrates an example system architecture 200 for controlling multiple PMICs for, according to at least one example. The SoC 102 may be an example of a component of a device, for example any device that includes computer systems or devices may include the SoC 102. For example, the SoC 102 may be implemented in a device such as an electronic device including, for example, a wireless mobile device, a mobile telephone, a mobile computing system, a laptop computer, a tablet computing device, a media player, a gaming device, a smart device, an Internet of Things device, a virtual reality and/or augmented reality device, a television, an appliance, a vehicle, or other such device. The device may include a wireless communication device configured to communicate with a radio access network, a core access network, the Internet, and/or other networks.

The SoC 102 is shown having dual pins, SDA 134 and SCK 136 through which signals are communicated as described herein. The SoC 102 may communicate and/or include multiple PMICs such as PMIC A 104, PMIC B 106, and PMIC C 108 and may also be in communication with or include components such as a processor (or processors) for example including core A 110, core B 112, DDR core 114, GPU core 116, codec 118, USB 120, VNNA 122, PLL1 124, PLL2 126, and I2C 128 for example. Though depicted with the SoC 102 including the components described above, the SoC 102 may include fewer or greater than the components listed above, with the above components listed as illustrative. The SoC 102 may have or need many different voltage supplies, and each one of those voltage supplies may be expected to be independently controlled. The different voltage supplies may be configured to provide voltage at varying levels to the components core A 110, core B 112, DDR core 114, GPU core 116, codec 118, USB 120, VNNA 122, PLL1 124, PLL2 126, and I2C 128. The different voltage supplies may be provided simultaneously to the components through one or more voltage rails using the PMICs (e.g., PMIC A 104, PMIC B 106, and PMIC C 108). The PMICs may generate the voltage rails for the voltage supplies for the components of the SoC 102. The voltage rails may include the voltage rails 138 through which power is supplied to the components of the SoC 102.

In operation, the PMICs control and provide the voltage rails 138 in a fast, responsive, and accurately timed manner. In an architecture with multiple different PMICs, controllers for each of the PMICs to produce a set of voltage rails are distributed across the PMICs providing the voltage rails. Therefore, accurate timing and responsiveness to commands for providing and/or adjusting power supplies is accomplished by synchronizing the multiple PMICs. The techniques and systems described herein provide for synchronization of the multiple PMICs to provide the required power supplies at the voltage rails, and control over the voltage levels at the voltage rails 138 without incurring significant additional hardware and complex architecture.

The PMICs include multiple PMICs, though more or fewer than shown in the figures may be implemented in some examples, following the configuration and layout described herein to scale up or down the number of PMICs.

For example, in FIG. 3, PMIC N 140 is shown coupled with the fault 130 line, the sync 132 line, the SDA 134 line, and the SCK 136 line. Successive and/or additional PMICs may be connected to these same lines for scaling to additional numbers of PMICs to handle any number of PMICs and enable the system architecture 200 to accommodate systems of increasing complexity that may require voltage rails 138 supplied by a plurality of PMICs. PMIC A 104 may be a main PMIC while PMIC B 106, PMIC C 108, and PMIC N 140 may be companion PMICs. The dual pins 134 and 136 may connect to the PMICs, in particular between PMIC A 104 and the SoC 102. Command data and/or control information and/or confirmation data may be exchanged through the dual pins over the I2C between the SoC 102 and PMIC A 104 and/or the other PMICs The one or more PMICs, that is, the main PMIC, PMIC A 104, and companion PMICs (PMIC B 106 and PMIC C 108) include the fault 130 and sync 132 communication interfaces. The communication interfaces connect the main PMIC with the companion PMICs, that is PMIC A 104 with PMIC B 106 and PMIC C 108 through two signal (e.g., fault 130 and sync 132) lines. The PMICs, that is, the main PMIC A 104, the companion PMIC B 106, and the companion PMIC C 108, may include a plurality of power converters to control the voltage rails 138 respectively connected to the PMICs, by using information provided through the communication interfaces SDA 134 and SCK 136, so that a power source voltage is supplied, or blocked, (e.g., enabled and/or disabled) to or from all or partial number of the power domains of the SoC 102. PMIC A 104 may be identified as being a PMIC providing voltage rails 138 to control a master reset of the SoC 102 in some examples.

The two signal (e.g., fault 130 and sync 132) lines may include a first signal communication channel and a second communication channel. According to at least one example embodiment, the first communication channel, fault 130 may perform communication using a single bidirectional signaling scheme, and the plurality of PMICs, for example, PMIC A 104, the PMIC B 106, and PMIC C 108, may be coupled to each other through the first communication channel, but the examples are not limited thereto. The fault 130 is an asynchronous "fault" signal that ensures an immediate response to various fault events occurring on one or more devices of the power supply system. This asynchronous fault signal provides low-latency communication such that prompt action may be taken against fault events.

The sync 132 is a single-wire "sync" signal. This sync signal transmits commands from one PMIC (e.g., a main or primary PMIC such as PMIC A 104) to the rest of the PMICs (e.g., PMIC B 106 and PMIC C 108). The sync 132 additionally synchronizes the actions of the different PMICs, for example in response to commands from an SoC to adjust or change power delivery to the device.

The sync 132 and fault 130 are communicated between all of the PMICs such that each PMIC will have connections to the SoC 102 through a first communication channel and a second communication channel, and each PMIC is connected to the other PMICs in the architecture through the fault signal and the sync signal rather than individually connecting each PMIC to every other PMIC in the system. Therefore, the system and technique provides scalability that enables the device to use any number of PMICs for power delivery solutions without requiring additional pins or connections between PMICs and/or between the PMICs and the SoC 102.

PMIC A 104 may include connections to interface with the fault 130 and sync 132 lines as well as control logic (e.g., control logic circuitry) configured to control the interface. In some examples, the control logic may be any processing circuitry capable of controlling the communication interface, such as hardware, logic circuits, processors, processor cores, etc.: a hardware/software combination such as at least one processor core executing software and/or executing any instruction set, etc. or a combination thereof. For example, the processing circuitry more specifically may include, but is not limited to, a field programmable gate array (FPGA), a programmable logic unit, an application-specific integrated circuit (ASIC), etc. The communication interface may include at least a first pin through which the fault 130 signal is transmitted and/or received, and a second pin through which the sync 132 signal is transmitted and/or received, but the example embodiments are not limited thereto. For example, through the first pin, the fault 130 information may be transmitted to the other PMICs, and the fault 130 information output from the other PMICs may be received by PMIC A 104. The fault 130 signal may be provided using a bidirectional signaling access scheme using a single wire, or in other words, the fault 130 signal line may be a bidirectional signal line. Through the second pin, the sync 132 signal output from PMIC A 104 may be transmitted to PMIC B 106 and PMIC C 108. The sync 132 signal may be provided using a single unidirectional signaling access scheme, or in other words, the sync 132 signal line may be a unidirectional signal line.

In some examples, the sync 132 and/or fault 130 signals may be signals used for assertion and/or de-assertion of an operation including power state confirmation of all of the plurality of PMICs, as well as the power ON/OFF of a total system, i.e., the device including SoC 102.

PMIC B 106 may include a communication interface connected to the at least two signals (e.g., fault 130 and sync 132) lines and a control logic circuitry configured to control the communication interface. The communication interface may include a first pin through which the fault 130 signal is transmitted and/or received and a second pin through which the sync 132 signal is received, etc.

PMIC C 108 may include a communication interface connected to the at least two signals (e.g., fault 130 and sync 132) lines and a control logic circuitry configured to control the communication interface. The communication interface may include a first pin through which the fault 130 signal is transmitted and/or received and a second pin through which the sync 132 signal is received, etc.

PMIC N 140 may include a communication interface connected to the at least two signals (e.g., fault 130 and sync 132) lines and a control logic circuitry configured to control the communication interface. The communication interface may include a first pin through which the fault 130 signal is transmitted and/or received and a second pin through which the sync 132 signal is received, etc.

Figure 4:
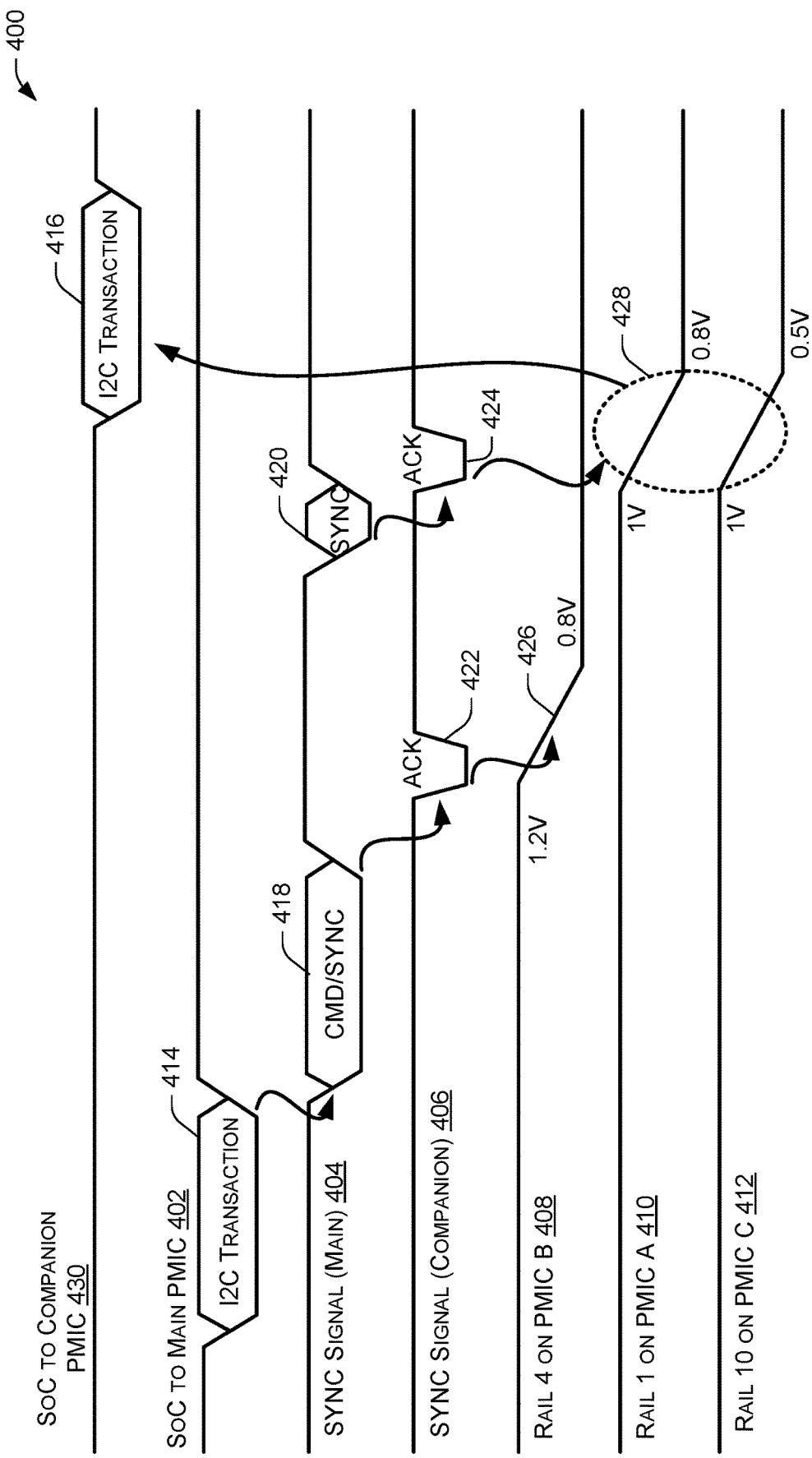
FIG. 4 illustrates an example waveform of signals for a power state transitions using multiple PMICs, according to at least one example.

FIG. 4 illustrates an example waveform 400 of signals for a power state transitions using multiple PMICs, according to at least one example. The power state transition is one of the actions that may be taken using the systems described herein. The systems and techniques described herein may enable power state transitions using a two-wire low-overhead signaling scheme as described with respect to FIGS. 1-3. The waveform 400 may provide information in an example embodiment of a power state transition and the signals involved.

The waveform 400 illustrates transitions and sequences of actions that may be carried out by the system architecture 100 of FIG. 1 with the SoC 102 and the PMICs working together to provide voltage rails 138. In the waveform 400, the example power transition may include a transition from an active to a low-power state transition.

In the illustrative example, the SoC 102 may instruct a change in a power state of the device, for example from an active power state to a low power state, and/or from a low power state to an active power state, and/or to change features or functions of the device. The SoC 102 may issue a command to the PMICs via a main PMIC instructing the change in the power state. The command may be issued to the main PMIC through the I2C communication bus. The main PMIC, through the sync signal, transmits the command to the remainder of the PMICs in the system. The single sync signal is simultaneously transmitted to the PMICs in the system. The command may include sequencing required for the transition, including sequences of actions by various different PMICs controlling different voltage rails. The sequencing may also include timing of the transitions and actions to be carried out. The sync signal is transmitted to all of the PMICs in the system. After the transition is completed, in some examples, the SoC may read the power state of the PMICs via the I2C communication bus (e.g., the read line) to confirm that the PMICs transitioned to the correct power state. In this manner, the power delivery transitions may be monitored in a closed loop fashion. In some examples, the power state may be communicated from one or more of the companion (e.g., secondary or non-main) PMICs. In this manner, the power state information is communicated through the PMICs other than the main PMIC, ensuring that the main PMIC properly communicated the command through the sync signal.

In the active to low-power transition, the SoC 102 initiates at signal 402, the I2C transaction 414 instructing a transition to the main PMIC. The main PMIC receives the transition and decodes the command to understand the task, to move the system into a low power state. In the example, this transition includes reducing the voltage on Rail 4 408, Rail1 410, and Rail 10 412 to pre-defined values (these values are also understood by companion PMICs as they are pre-defined). Further requirement is to change Rail 4 408 first and then to change Rail 1 410 and Rail 10 412 at the same time.

The main PMIC may start the sequence by sending a command 418 on the sync signal line. Based on the pre-agreed protocol, the companion PMICs may acknowledge and drive the sync signal line, and thereby acknowledge 422 the command 418. The acknowledge 422 may also serves as a synchronization signal so that all the voltage change can happen at the same time.

The acknowledge 422 signal may trigger PMIC B to move Rail 4 408 from 1.2V to 0.8V at 426. A second acknowledge 424 in response to the second sync 420 signal may trigger both PMIC A and PMIC C to move Rail 1 410 and Rail 10 412 respectively to 0.8V and 0.5V at 418. The particular PMICs that react to the second acknowledge 424 is based on a predefined configuration for power-state transitions, and all PMICs in the system may have stored predefined data including the configurations.

After all the power transitions are completed according to waveform 400 based on the I2C transaction 414, a second I2C transaction 416 may be accomplished to confirm that the rail updates are complete. In some examples, the second I2C transaction 416 may be performed across signal 430 that communicates between the SoC and a companion PMIC. In some examples, the second I2C transaction 416 may be performed across signal 402. As described herein, the SoC 102 may receive the information from the main PMIC or may receive the information from one of the companion PMICs, thereby ensuring that the sync signal was sent by the main PMIC and received by the companion PMICs as described herein.

Figure 5:
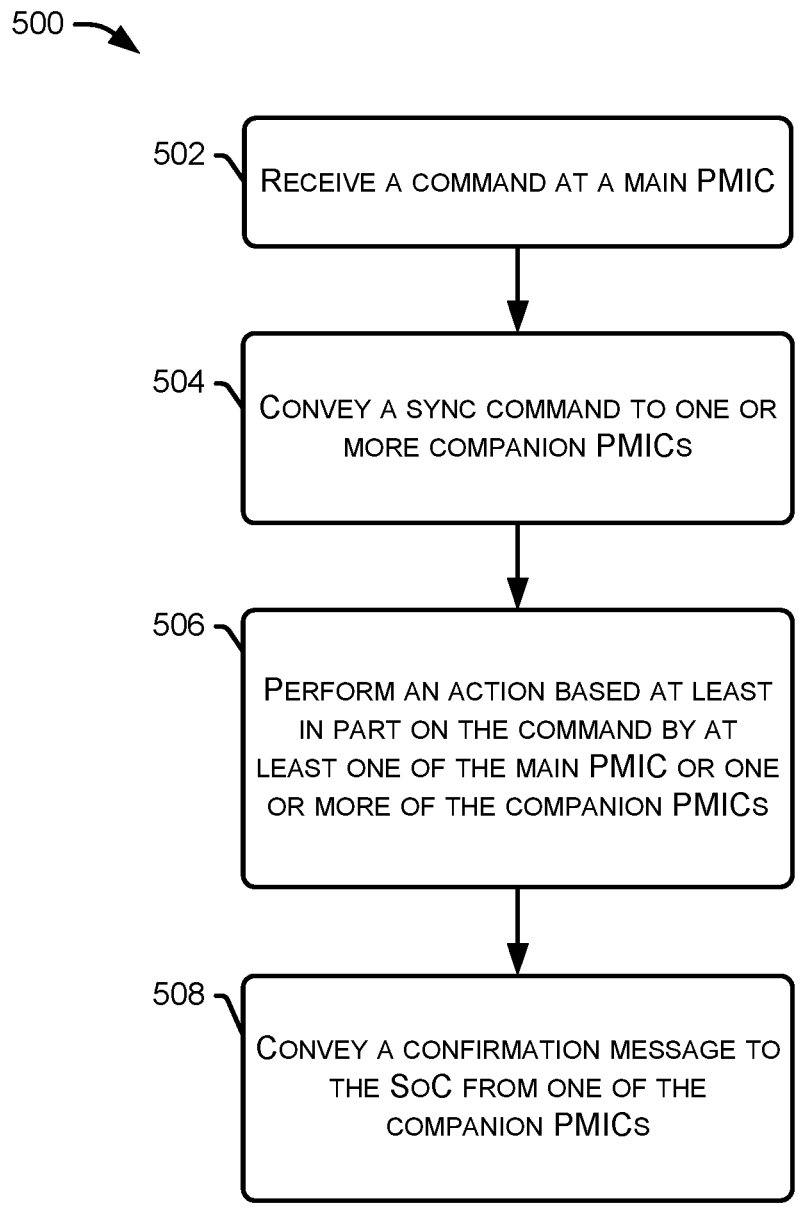
FIG. 5 is a flow diagram of a process to coordinate and control multiple PMICs for power delivery to a device, according to at least one example.

FIG. 5 is a flow diagram of a process 500 to coordinate and control multiple PMICs for power delivery to a device, according to at least one example. The process 500 may be performed, at least in part, by a processor of a computing device, such as the user device and/or a subsystem of the user device. The process 500 may be performed on one or more devices within the user device. The process 500 may be implemented as processor-executable instructions that may be stored on a suitable non-transitory storage medium. Though depicted in a particular order in FIG. 5, the steps of process 500 may be performed in other orders or arrangements, and in some examples, process 500 may include additional or fewer steps than depicted in FIG. 5.

At 502, the process 500 includes receiving a command at a main PMIC. The command may be received from an SoC or other such device and may include one or more instructions to instruct a change in a power state of the device, for example from an active power state to a low power state, and/or from a low power state to an active power state, and/or to change features or functions of the device. The SoC may issue a command to the PMICs via a main PMIC instructing the change in the power state. The command may be issued to the main PMIC through the I2C communication bus.

At 504, the process 500 includes conveying a sync command to one or more companion PMICs from the main PMIC. The main PMIC, through the sync signal, transmits the command to the remainder of the PMICs in the system. The single sync signal is simultaneously transmitted to the PMICs in the system. The command may include sequencing required for the transition, including sequences of actions by various different PMICs controlling different voltage rails. The sequencing may also include timing of the transitions and actions to be carried out. The sync signal is transmitted to all of the PMICs in the system.

At 506, the process 500 includes performing an action based at least in part on the command by at least one of the main PMIC or one or more of the companion PMICs. The action may include one or more steps or sequences for performing the transition from the command. In some examples, the action may include a sequence and timing of multiple different voltage rail transitions.

At 508, the process 500 includes conveying a confirmation message to the SoC from one of the companion PMICs. After the transition is completed, in some examples, the SoC may read the power state of the PMICs via the I2C communication bus (e.g., the read line) to confirm that the PMICs transitioned to the correct power state. In this manner, the power delivery transitions may be monitored in a closed loop fashion. In some examples, the power state may be communicated from one or more of the companion (e.g., secondary or non-main) PMICs. In this manner, the power state information is communicated through the PMICs other than the main PMIC, ensuring that the main PMIC properly communicated the command through the sync signal.

Figure 6:
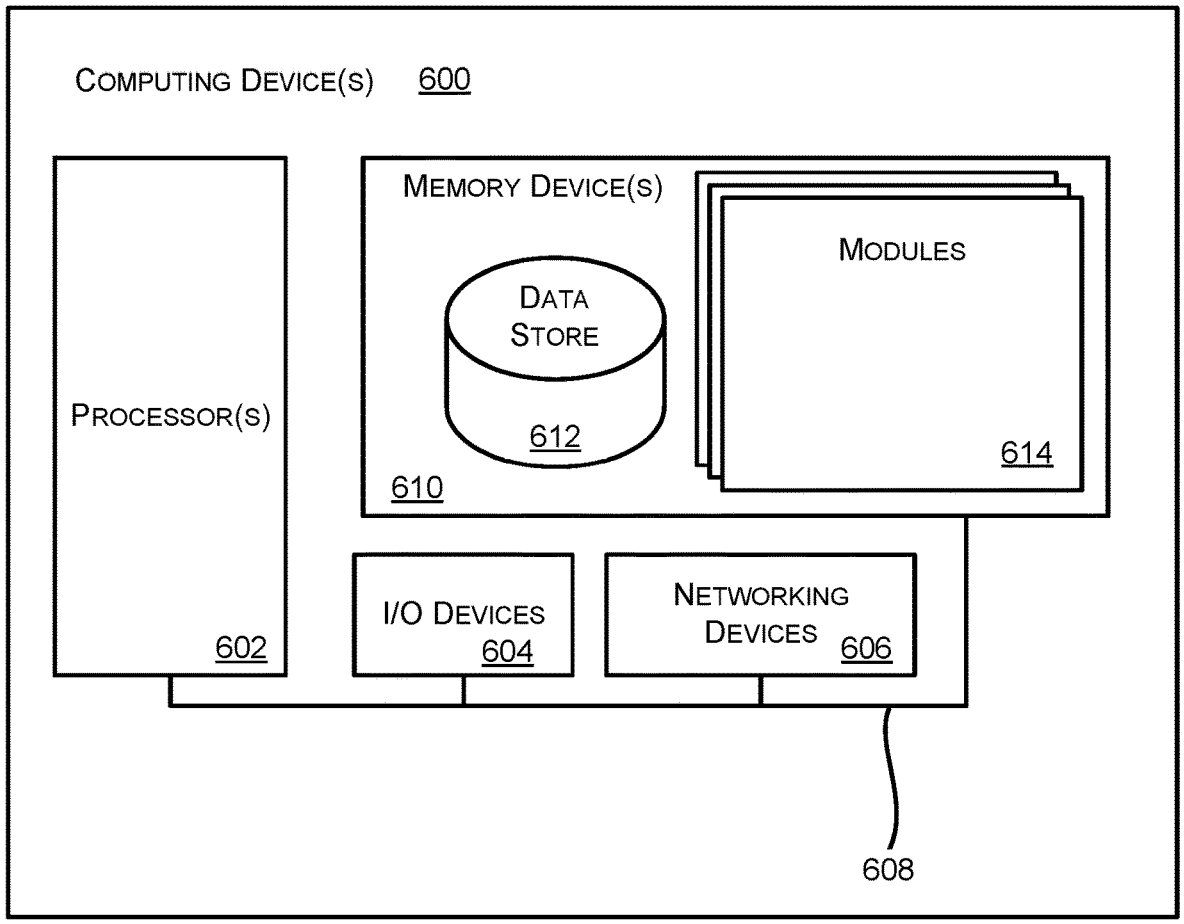
FIG. 6 illustrates a block diagram of a computing system that may implement the multiple PMICs for power delivery, according to at least some examples.

FIG. 6 illustrates a block diagram of a computing device 600 that may implement the multiple PMICs for power delivery, according to at least some examples. In some examples, the processes and techniques may be implemented with firmware as part of a device rather than as software operated on the computing device 600. The computing device 600 may include one or more computing devices on which services or modules of this technology may execute. The computing device 600 is illustrated on which a high-level example of the technology may be executed. The computing device 600 may be an example of a component, such as the SoC or other component of the device that may implement the processes and techniques described herein, including instructing a set of PMICs to perform various power transitions for a device. The computing device 600 may include one or more processors 602 that are in communication with memory devices 610. The computing device 600 may include a local communication interface 608 for the components in the computing device. For example, the local communication interface 608 may be a local data bus and/or any related address or control busses as may be desired.

The memory device 610 may contain modules 614 that are executable by the processor(s) and data for the modules 614. The modules 614 may include modules for carrying out the techniques and processes described herein, such as the process 500 described with respect to FIG. 5, or other techniques included herewith. A data store 612 may also be located in the memory device 610 for storing data related to the modules and other applications along with an operating system that is executable by the processor 602.

Various applications may be stored in the memory device 610 and may be executable by the processor 602. Components or modules discussed in this description that may be implemented in the form of software using high programming level languages that are compiled, interpreted or executed using a hybrid of the methods.

The computing device 600 may also have access to I/O (input/output) devices 604 that are usable by the computing devices. An example of an I/O device 604 is a display screen that is available to display output from the computing devices. Other known I/O device may be used with the computing device as desired. Networking devices 606 and similar communication devices may be included in the computing device 600. The networking devices 606 may be wired or wireless networking devices 606 that connect to the internet, a LAN, WAN, or other computing network.

The components or modules that are shown as being stored in the memory device 610 may be executed by the processor 602. The term "executable" may mean a program file that is in a form that may be executed by a processor 602. For example, a program in a higher-level language may be compiled into machine code in a format that may be loaded into a random-access portion of the memory device 610 and executed by the processor 602, or source code may be loaded by another executable program and interpreted to generate instructions in a random-access portion of the memory to be executed by a processor 602. The executable program may be stored in any portion or component of the memory device 610. For example, the memory device 610 may be random access memory (RAM), read only memory (ROM), flash memory, a solid-state drive, memory card, a hard drive, optical disk, floppy disk, magnetic tape, or any other memory components.

The processor 602 may represent multiple processors and the memory device 610 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

It is noted that any of the distributed system implementations described above, or any of their components, may be implemented as one or more web services. In some implementations, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke and may define a particular application programming interface (API) to which other systems may be expected to conform when requesting the various operations.

In various implementations, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some implementations, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A power management system for a device, comprising:
a system on a chip (SoC) comprising a communication interface comprising a first communication pin and a second communication pin;
a first power management integrated circuit (PMIC) coupled to the first communication pin through a first wire and coupled to the second communication pin through a second wire and configured to provide power to the SoC on a first plurality of voltage rails; and
a second PMIC coupled to the first wire and the second wire and further coupled to the first PMIC through a unidirectional synchronization channel between the first PMIC and the second PMIC and a bidirectional fault channel between the first PMIC and the second PMIC, the bidirectional fault channel configured for asynchronous signaling of fault events, and the second PMIC configured to provide power to the SoC on a second plurality of voltage rails, wherein:
the SoC sends, via the first communication pin, a first signal to the first PMIC, the first signal causing a change in a power state of one or more of the first or the second plurality of voltage rails; and
the first PMIC sends, via the unidirectional synchronization channel and based on the first signal, a second signal to the second PMIC, the second signal causing the second PMIC to sync the change in the power state.

2. The power management system of claim 1, wherein:
the communication interface further comprises an I2C communication bus; and
the change in the power state comprises a timing for the change in the power state and a sequence of voltage changes for the first or the second plurality of voltage rails.

3. A method, comprising:
receiving, by a first power management integrated circuit (PMIC) coupled with a system on a chip (SoC) through a first wire coupled to a first communication pin of a first communication connection, a command from the SoC, the command causing a change in a power state of one or more voltage rails provided to the SoC from the first PMIC and a second PMIC, wherein:
the first PMIC is further coupled with the SoC through a second wire coupled to a second communication pin of the first communication connection, and
the second PMIC is coupled to the first wire and the second wire and further coupled to the first PMIC through a second communication connection comprising a unidirectional synchronization channel between the first PMIC and the second PMIC and a bidirectional fault channel between the first PMIC and the second PMIC;
syncing, through the unidirectional synchronization channel, the command causing the change in the power state of the one or more voltage rails of the SoC;
causing, in response to syncing the command, the first PMIC or the second PMIC to change the power state of the one or more voltage rails; and
sending a message to the SoC confirming the change of the power state.

4. The method of claim 3, wherein syncing the command comprises syncing, through the unidirectional synchronization channel, a third PMIC to the first PMIC, the first PMIC, the second PMIC, and the third PMIC configured to provide a plurality of voltage rails comprising the one or more voltage rails.

5. The method of claim 3, wherein sending the message comprises sending, by the second PMIC, the message to the SoC.

6. The method of claim 3, wherein syncing the command comprises syncing a voltage level and a timing for the change of the power state.

7. The method of claim 3, wherein the first PMIC is configured for control of a primary reset for a processing unit of the SoC.

8. The method of claim 3, wherein:
the command comprises a change from a first power state to a second power state, the second power state different from the first power state; and
syncing the power state transition comprises the first PMIC sending a sequence of one or more changes in voltage for the change of the power state from the first power state to the second power state.

9. The method of claim 3, wherein the unidirectional synchronization channel is configured for communication of sync events between the first PMIC and the second PMIC.

10. The method of claim 3, wherein the bidirectional fault channel is configured for asynchronous communication of fault events between the first PMIC and the second PMIC.

11. The method of claim 3, wherein:
the SoC comprises an I2C communication bus.

12. A system, comprising:
a system on a chip (SoC) comprising a first communication pin and a second communication pin;
a first power management integrated circuit (PMIC) coupled to the SoC through a first wire coupled to the first communication pin, a second wire coupled to the second communication pin, and a first plurality of voltage rails; and
a second PMIC, wherein the second PMIC:
is coupled to the first wire and the second wire and a second plurality of voltage rails,
is coupled to the first PMIC through a unidirectional synchronization channel between the first PMIC and the second PMIC and a bidirectional fault channel between the first PMIC and the second PMIC, and
receives a sync signal from the first PMIC via the unidirectional synchronization channel in response to the first PMIC receiving a command from the SoC, the command causing a change in a power state of one or more voltage rails of the first plurality of voltage rails or the second plurality of voltage rails.

13. The system of claim 12, further comprising:
a third PMIC, wherein the third PMIC:
is coupled to the first wire and the second wire and a third plurality of voltage rails,
is coupled to the first PMIC through the unidirectional synchronization channel and the bidirectional fault channel, and
receives the sync signal from the first PMIC via the unidirectional synchronization channel in response to the first PMIC receiving the command from the SoC.

14. The system of claim 12, wherein the command comprises:
a change from a first power state to a second power state, the second power state different from the first power state; and
a sequence of one or more changes in voltage for one or more of the first plurality of voltage rails or the second plurality of voltage rails.

15. The system of claim 12, wherein the first PMIC is configured for control of a primary reset for a processing unit of the SoC.

16. The system of claim 12, wherein the second PMIC is further configured to send a message to the SoC via the second wire coupled to the second communication pin, the message confirming the change in the power state.

17. The system of claim 12, wherein the bidirectional fault channel is configured for asynchronous communication of fault events between the first PMIC and the second PMIC.

18. The system of claim 12, further comprising:
a third PMIC, and
wherein the third PMIC receives the sync signal from the first PMIC via the unidirectional synchronization channel.

19. The system of claim 12, wherein the sync signal from the first PMIC via the unidirectional synchronization channel in response to the first PMIC receiving the command comprises syncing a voltage level and a timing for the change of the power state.

20. The system of claim 12, wherein the unidirectional synchronization channel is configured for communication of sync events between the first PMIC and the second PMIC.

* * * * *